(12) United States Patent
Oh et al.

(10) Patent No.: US 6,884,875 B2
(45) Date of Patent: Apr. 26, 2005

(54) REACTIVE BLUE DYE CONTAINING A VINYL SULPHONE GROUP

(75) Inventors: Sea-Wha Oh, Daejeon (KR); Young-Suk Kim, Daejeon (KR); Jinsoo Kim, Daejeon (KR); Tae Kyung Kim, Daejeon (KR); Sun Il Kim, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 10/661,491

(22) Filed: Sep. 15, 2003

(65) Prior Publication Data

US 2004/0143106 A1 Jul. 22, 2004

(30) Foreign Application Priority Data

Jan. 18, 2003 (KR) ................. 10-2003-0003489

(51) Int. Cl.$^7$ ............................................ C09B 62/613
(52) U.S. Cl. ....................... 534/582; 534/642
(58) Field of Search ................. 534/582, 642

(56) References Cited

FOREIGN PATENT DOCUMENTS

JP          43-15299          6/1943

OTHER PUBLICATIONS

Cho et al.; "Reactive Dyeing Systems for Wool Fibres Based on Hetero–Bifunctional Reactive Dyes. Part 1: Application of Commercial Reactive Dyes"; Coloration Technology, vol. 118, pp. 198–204, (2002).

*Primary Examiner*—Fiona T. Powers
(74) *Attorney, Agent, or Firm*—Finnegan, Henderson, Farabow, Garrett & Dunner, LLP

(57) ABSTRACT

The present invention relates to a reactive blue dye, and more particularly to a reactive blue dye represented by the following Formula 1, which is effective in black dyeing or printing of polyamide textiles, in particular, nylon fiber, (1)

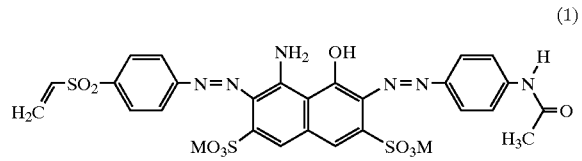

wherein M is a hydrogen atom or an alkali metal atom.

The blue dye of the present invention offers superior color yield, reactivity, fixing efficiency, light fastness, and washing fastness, substantivity, and superior cleaning properties over unfixed dyes.

3 Claims, No Drawings

REACTIVE BLUE DYE CONTAINING A VINYL SULPHONE GROUP

BACKGROUND OF THE INVENTION

1. Field of the Invention

The present invention relates to a reactive blue dye, and more particularly to a reactive blue dye represented by the following Formula 1, which is effective in black dyeing or printing of polyamide textiles, in particular, nylon fiber.

(1)

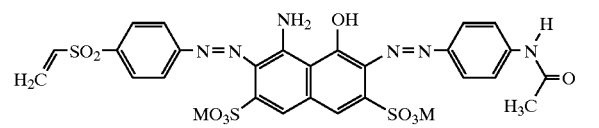

In Formula 1, M is a hydrogen atom or an alkali metal atom.

2. Description of the Related Art

Polyamide textiles, especially nylon fiber, have drawn much attention as a material for sportswear. In general, acid dyes are used for dyeing or printing of nylon fiber. However, when acid dyes are used for heavy color dyeing, the result of washing fastness becomes poor. Binders are often used to solve this problem, but they have drawbacks such as high cost and the deterioration of touch. Metal complex acid dyes used for high light fastness are undesirable in terms of environmental contamination related to heavy metals.

Japanese Patent Unexamined Publication No. Sho 43-15299 discloses an H-acid derived monofunctional disazo blue dye, which is nobtained by diazotization of 4-aminophenyl-β-sulfatoethylsulphone represented by the following Formula A.

(A)

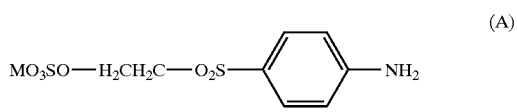

In Formula A, M is a hydrogen atom or an alkali metal atom.

Since the 4-aminophenyl-β-sulfatoethylsulphone substituted monofunctional blue dye is highly soluble in water, it is separated by salting out using a large amount of salts. In the process, wastewater contaminated with the concentrated dyes and salts is generated. When this dye is applied for dyeing, the dyeing efficiency is poor because of the low substantivity of the dye as well as the concentrated wastewater of the unfixed dyes is generated, thereby increasing the cost for the wastewater treatment. Also, due to the increasing demand on the use of liquefied dyes considering workers' health and automation of dyeing processes, a concentrated dye with low salt content is highly required.

As another blue dye, 4-aminophenyl vinylsulphone (Formula B) substituted dye is reported [Ho Jung Cho and D. M. Lewis, *Coloration Technology*, 2002, 116, 198–204] to be (B)

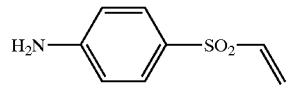

less soluble in water than the 4-aminophenyl-β-sulfatoethylsulphone (Formula A) substituted dye, it is more advantageous in salting out. In fact, because no salt is added during the separation of the 4-aminophenyl vinylsulfone (Formula B) the salt content of the wastewater can be reduced.

(B)

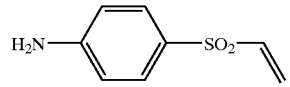

Moreover, since the obtained dye contains less salt, the salt content of the dyeing wastewater can be reduced, and the desalination process to obtain a liquefied dye becomes simpler.

SUMMARY OF THE INVENTION

The present inventors tried to develop a new reactive dye for dyeing or printing of polyamide textiles, which has good substantivity, superior cleaning properties over unfixed dyes, and good color yield, reactivity, and fixing efficiency. As a result, we synthesized a novel reactive blue dye by introducing diazo phenyl radicals, particularly 4-aminophenyl vinylsulphone radical and 4-aminoacetanilide radical respectively, into H-acid.

Accordingly, an object of the present invention is to provide a novel reactive blue dye for heavy color dyeing, which satisfies the above-mentioned requirements and has superior light fastness and washing fastness, and a method for the preparation of the same.

DETAILED DESCRIPTION AND THE PREFERRED EMBODIMENTS

The present invention relates to a reactive blue dye represented by the following Formula 1 and a method for the preparation of the same:

(1)

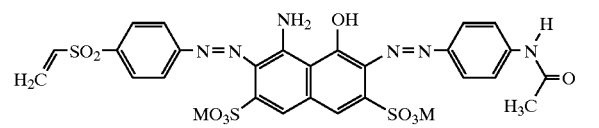

wherein M is a hydrogen atom or an alkali metal atom.

Hereunder is given a more detailed description of the present invention.

The present invention relates to a blue dye used for heavy color dyeing, especially for black dyeing of polyamide textiles, and more particularly to a reactive blue dye containing a functional group that can form a covalent bond with the amine group of polyamide textiles thus being effective in black dyeing or printing of polyamide textiles. The novel reactive blue dye of the present invention as shown in Formula 1 is derived from H-acid where 4-aminophenyl vinylsulphone and 4-aminoacetanilide are diazotized and coupled at C-2 and C-7, respectively.

The novel reactive blue dye of Formula 1 is prepared via the following Scheme 1:

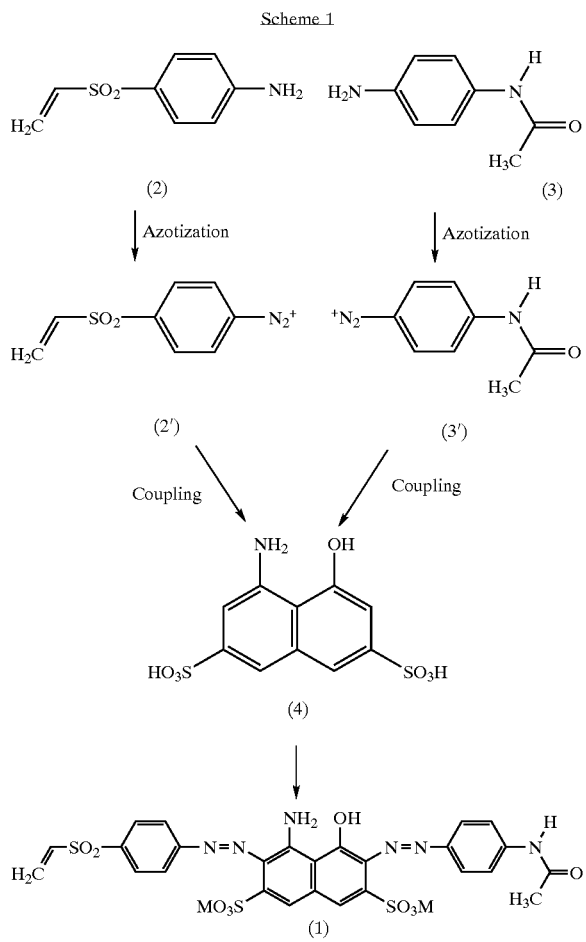

wherein M is a hydrogen atom or an alkali metal atom.

The preparation process of Scheme 1 comprises the following two steps: a) a step of diazotization of 4-aminophenyl vinylsulphone represented by Formula 2 and the first coupling reaction with 1-naphthol-8-amino-3,6-disulphonic acid represented by Formula 4; and b) a step of diazotization of 4-aminoacetanilide represented by Formula 3 and the second coupling reaction with the solution resulted from the step a).

The diazotization of the compounds represented by Formula 2 and Formula 3 is carried out in the temperature range of 0 to 5° C. using sodium nitrite.

The coupling reactions for the introduction of azo groups on the C-2 and C-7 of 1-naphthol-8-amino-3,6-disulphonic acid represented by Formula 4 are carried out in two stages. In the first, coupling reaction of the diazo component, represented by Formula 2', is achieved in the introduction of the 4-aminophenyl vinylsulphone group on the C-2 of 1-naphthol-8-amino-3,6-disulphonic acid, represented by Formula 4, under the condition of 5 to 10° C. and pH 1.0 to 2.0. Under the condition of 5 to 10° C. and pH 6.5 to 7.5 the diazo component of 4-aminoacetanilide represented by Formula 3', is introduced onto the C-7 of 1-naphthol-8-amino-3,6-disulphonic acid, represented by Formula 4, that is called the second coupling reaction. Through the first and the second coupling reactions is obtained a reactive blue dye of the present invention represented by Formula 1.

Hereinafter, the present invention is described specifically in Example, Comparative Example, and Experimental Example. However, the following Example is only for the understanding of the present invention, and the present invention is not limited by the following Example.

EXAMPLE (1) Diazotization of 4-aminophenyl vinylsulphone and first coupling reaction To the 25 mL of water in a beaker 1.85 g (99%, 0.01 mol) of 4-aminophenyl vinylsulphone was added. While stirring, the suspension was cooled down to 5° C. using an ice bath. To this mixture 3.67 mL (3N, 0.011 mol) of $NaNO_2$ and 5 g of ice were added. Then, 2.5 mL of concentrated hydrochloric acid was added to obtain a diazo component of 4-aminophenyl vinylsulphone. Excess $HNO_2$ was removed by adding a small amount of sulfamic acid.

To the 40 mL of water in a beaker 3.9 g (82%, 0.01 mol) of 1-naphthol-8-amino-3,6-disulphonic acid was added. This solution was neutralized (pH=7) with 2.5 mL of 4N NaOH aqueous solution and the 1-naphthol-8-amino-3,6-disulphonic acid was completely dissolved. This aqueous solution was transferred to a dropping funnel and was added dropwise to the diazo component aqueous solution of 4-aminophenyl vinylsulphone while keeping the temperature at 0 to 5° C. to complete the first coupling reaction.

$^1$H-NMR (300 MHz, DMSO-$d^6$) δ10.62 (2H, br), 7.89 (4H, br), 7.52 (1H, s), 7.40~7.36 (1H, d, 12 Hz), 7.18~7.10 (1H, dd, 9 Hz, 6 Hz), 6.36~6.30 (1H, d, 18 Hz), 6.21~6.18 (1H, d, 9 Hz)

(2) Diazotization of 4-aminoacetanilide and the Second Coupling Reaction

To the 25 mL of water in a beaker 1.51 g (99%, 0.01 mol) of 4-aminoacetanilide was added. While stirring, the suspension was cooled down to 5° C. using an ice bath. To this suspension 3.67 mL (3N, 0.011 mol) of $NaNO_2$ and 5 g of ice were added. Then, 2.6 mL of concentrated hydrochloric acid was added to obtain a diazo component of 4-aminoacetanilide. Excess $HNO_2$ was removed by adding a small amount of sulfamic acid.

To the solution where the first coupling reaction (1) was completed the aqueous diazo component solution of 4-aminoacetanilide was poured at once. Then, 12 mL of 20% $Na_2CO_3$ aqueous solution was added dropwise keeping the temperature at 5 to 10° C. to complete the second coupling reaction while adjusting pH of the reaction mixture from 1.0–1.4 to 6.5. Completion of the reaction was followed by TLC. After warming up to the room temperature, the reaction mixture was filtered and the cake was dried to obtain the reactive blue dye of the present invention represented by the following Formula 1.

$^1$H-NMR (300 MHz, DMSO-$d^6$) δ616.25 (1H, s), 10.72 (1H, s), 10.54 (1H, s), 10.15 (1H, s), 8.23~8.21 (2H, d, J=6 Hz), 7.98~7.96 (2H, d, J=6 Hz), 7.77~7.75 (2H, d, J=6 Hz), 7.44(1H, s), 7.35 (1H, s), 7.21~7.16 (1H, dd, J=6 Hz, 12 Hz), 6.39~6.35 (1H, d, J=12 Hz), 6.23~6.21 (1H, d, J=6 Hz), 2.06 (3H, s).

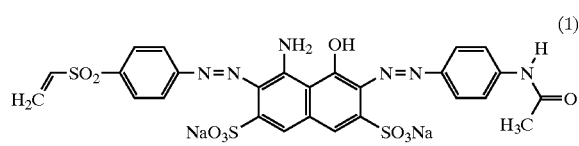

(1)

COMPARATIVE EXAMPLE (1) Diazotization of 4-aminophenyl-β-sulfatoethylsulphone and First coupling Reaction To the 25 mL of water in a beaker 2.96 g (95%, 0.01 mol) of 4-aminophenyl-β-sulfatoethylsulphone was added. While stirring, the suspension was cooled down to 5° C. using an ice bath. To this solution 3.67 mL (3N, 0.011 mol) of NaNO$_2$ and 5 g of ice were added. Then, 2.6 mL of concentrated hydrochloric acid was added to obtain a diazo component of 4-aminophenyl-β-sulfatoethylsulphone. Excess HNO$_2$ was removed by adding a small amount of sulfamic acid.

To another beaker 3.9 g (82%, 0.01 mol) of 1-naphthol-8-amino-3,6-disulphonic acid and 40 mL of water were added. This solution was neutralized (pH=7) with 2.5 mL of 4N NaOH aqueous solution and the 1-naphthol-8-amino-3,6-disulphonic acid was completely dissolved. This aqueous solution was transferred to a dropping funnel and was added dropwise to the diazo component aqueous solution of 4-aminophenyl vinylsulphone while keeping the temperature at 0 to 5° C. to complete the first coupling.

$^1$H-NMR (300 MHz, DMSO-d$^6$) δ11.76 (1H, br), 10.58 (2H, br), 7.95~7.92 (4H, m), 7.52 (1H, s), 7.36 (1H, s, 1 Hz), 7.27 (1H, br), 4.00~3.95 (2H, t, 6 Hz, 9 Hz), 3.68~3.63 (2H, t, 6 Hz, 9 Hz).

(2) Diazotization of 4-aminoacetanilide and the Second Coupling Reaction

To the 25 mL of water 1.51 g (99%, 0.01 mol) of 4-aminoacetanilide was added. While stirring, the suspension was cooled down to 5° C. using an ice bath. To this suspension 3.67 mL (3N, 0.011 mol) of NaNO$_2$ and 5 g of ice were added. Then, 2.6 mL of concentrated hydrochloric acid was added to obtain a diazo component of 4-aminoacetanilide. Excess HNO$_2$ was removed by adding a small amount of sulfamic acid.

To the solution where the first coupling reaction was completed (1) the aqueous diazo component solution of 4-aminoacetanilide was added at once. Then, 14 mL of 20% Na$_2$CO$_3$ aqueous solution was added dropwise keeping the temperature at 5 to 10° C. to complete the second coupling reaction while adjusting pH of the reaction mixture from 1.0–1.4 to 6.5. Completion of the reaction was followed by TLC. After the reaction was completed, a small amount of dilute hydrochloric acid was added to adjust pH of the reaction mixture to 4.5. Then, 15 g of salt was slowly added for salting out. Then, the reaction solution was filtered and the cake was dried to obtain the reactive blue dye represented by the following Formula C.

$^1$H-NMR (300 MHz, DMSO-d$^6$) δ16.25 (1H, s), 10.73 (1H, s), 10.56 (1H, s), 10.21 (1H, s), 8.23~8.21 (2H, d, J=9 Hz), 8.00~7.98 (2H, d, J=9 Hz), 7.78~7.75 (2H, d, J=9 Hz), 7.72~7.69 (2H, d, J=9 Hz), 7.47 (1H, s), 7.38 (1H, s), 4.01~3.97 (2H, t, J=6 Hz), 3.71~3.66 (2H, t, J=6 Hz), 2.06 (3H, s).

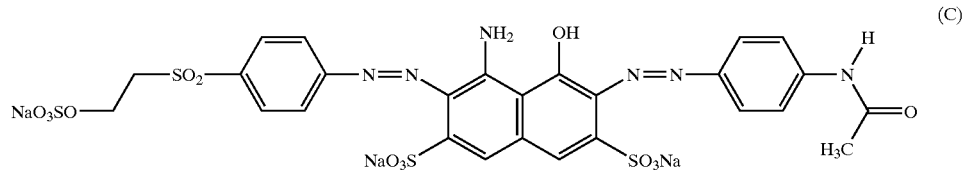

(C)

EXPERIMENTAL EXAMPLE OF DYEING

The reactive blue dyes prepared in Example and Comparative Example were applied to nylon fiber by exhaustion dyeing method, and dyeing efficiency and light fastness were measured. The dyeing efficiency was calculated according to the following Equation 1:

Equation 1

$$\text{Dyeing efficiency } (\%) = (1 - A_1/A_0) \times 100$$

In Equation 1: $A_0$ is the light absorbance before dyeing; and $A_1$ is the sum of the light absorbance after dyeing and washing.

TABLE 1

| Classification | | Example | Comparative Example |
|---|---|---|---|
| Dyeing efficiency (%) | 1% o.w.f. | 89.4 | 80.4 |
|  | 3% o.w.f. | 83.1 | 73.4 |
| Washing fastness level[a] | 1% o.w.f. | 5 | 5 |
|  | 3% o.w.f. | 5 | 5 |
| Light fastness level[b] | 1% o.w.f. | 4–5 | 3–4 |
|  | 3% o.w.f. | 5 | 4–5 |

[a] Determined by KS K 030 A-4
[b] Determined by KS K 0218 direct lighting

As shown in Table 1, the reactive blue dye of the present invention (Example), which has the 4-aminophenyl vinylsulphone group and the 4-aminoacetanilide group, showed much superior dyeing efficiency than the reactive blue dye (Comparative Example), which has the 4-aminophenyl-β-sulfatoethylsulphone group. And, while there was no difference in washing fastness, the reactive blue dye of the present invention showed improved light fastness.

The visible absorption spectrum of the reactive blue dye of the present invention ($\lambda_{max}$=626.2 nm, $\epsilon_{mol/1}$=5.6×10$^4$, $\epsilon_{g/1}$=77.99) was compared with that of the CI Reactive Black 5 ($\lambda_{max}$=598.8 nm, $\epsilon_{mol/1}$=3.7×10$^4$, $\epsilon_{g/1}$=49.27). The $\lambda_{max}$ shifted toward the longer wavelength ($\Delta\lambda$=27.4 nm) and the light absorbance increased. Accordingly, when the reactive blue dye of the present invention is applied for dyeing or printing of nylon fiber, superior color yield, fixing efficiency, light fastness, and washing fastness can be obtained economically.

As explained in detail above, the reactive blue dye of the present invention has improved dyeing efficiency and washing fastness by introducing the 4-aminophenyl vinylsulphone group, which is capable of forming a covalent bond with the amine group of nylon fiber. In addition, the water-solubility of the dye is lowered, and thus no salt is added during the separation process. Consequently, a highly pure dye can be obtained and the salt content of the wastewater can be reduced. While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A reactive blue dye represented by the following Formula 1, which is characterized by introduction of a 4-aminophenyl vinylsulphone group and a 4-aminoacetanilide group:

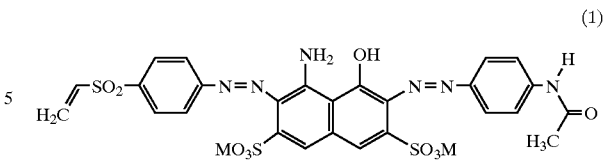

wherein M is a hydrogen atom or an alkali metal atom.

2. A method for the preparation of a reactive blue dye represented by the following Formula 1, which comprises:

a) diazotization of 4-aminophenyl vinylsulphone represented by the following Formula 2 and first coupling with 1-naphthol-8-amino-3,6-disulphonic acid represented by the following Formula 4; and b) diazotization of 4-aminoacetanilide represented by the following Formula 3 and the second coupling with the solution of said step a):

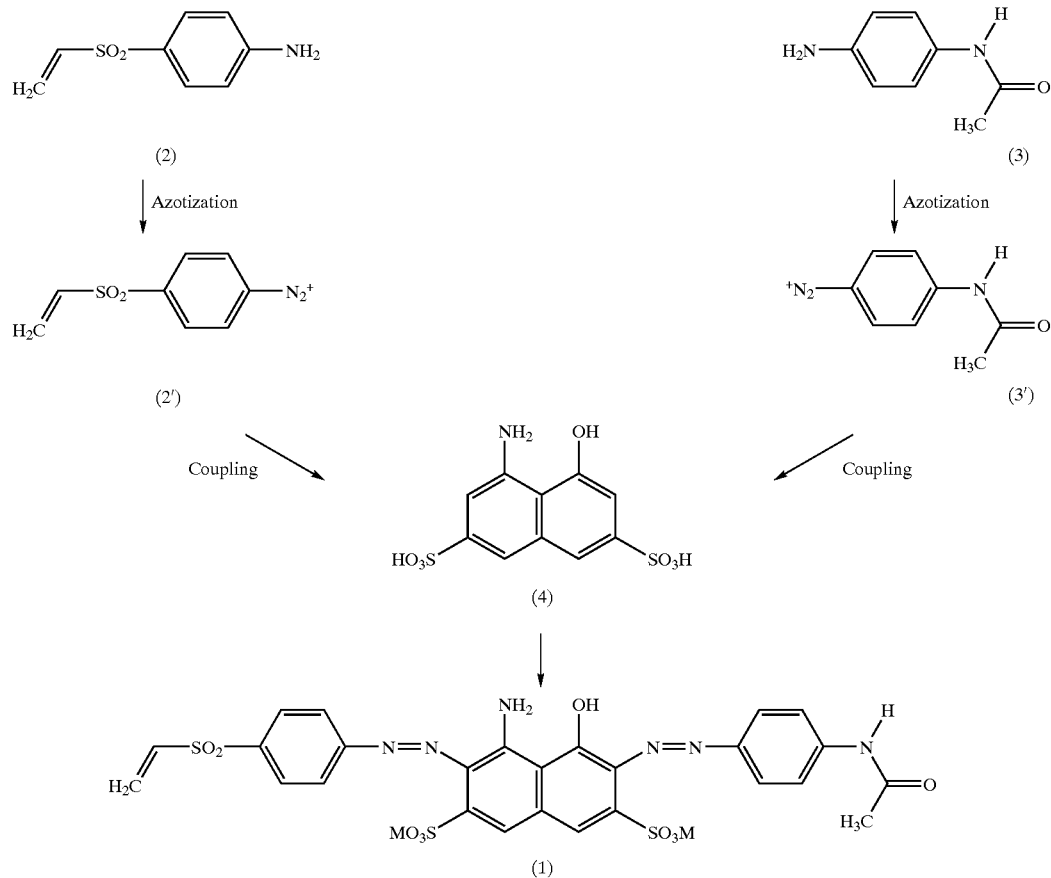

wherein M is a hydrogen atom or an alkali metal atom.

3. The method for a preparation of a reactive blue dye according to claim 2, wherein the first coupling is carried out under the condition of 5 to 10° C. and pH 1.0 to 2.0, and the second coupling is carried out under the condition of 5 to 10° C. and pH 6.5 to 7.5.

* * * * *

UNITED STATES PATENT AND TRADEMARK OFFICE
CERTIFICATE OF CORRECTION

PATENT NO. : 6,884,875 B2
DATED : April 26, 2005
INVENTOR(S) : Sea-Wha Oh et al.

It is certified that error appears in the above-identified patent and that said Letters Patent is hereby corrected as shown below:

Columns 7 and 8,
Line 28, "azotization" should read -- azolization --.

Signed and Sealed this

Sixteenth Day of August, 2005

JON W. DUDAS
*Director of the United States Patent and Trademark Office*